(12) United States Patent
Yanagawa et al.

(10) Patent No.: US 10,723,311 B2
(45) Date of Patent: Jul. 28, 2020

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 100 days.

(21) Appl. No.: 16/076,763

(22) PCT Filed: Jan. 25, 2017

(86) PCT No.: PCT/JP2017/002556
§ 371 (c)(1),
(2) Date: Aug. 9, 2018

(87) PCT Pub. No.: WO2017/141649
PCT Pub. Date: Aug. 24, 2017

(65) Prior Publication Data
US 2019/0047510 A1 Feb. 14, 2019

(30) Foreign Application Priority Data
Feb. 17, 2016 (JP) ................................. 2016-028313

(51) Int. Cl.
*B60R 22/46* (2006.01)
*B60R 22/405* (2006.01)
*B60R 22/28* (2006.01)

(52) U.S. Cl.
CPC .......... *B60R 22/4628* (2013.01); *B60R 22/28* (2013.01); *B60R 22/405* (2013.01);
(Continued)

(58) Field of Classification Search
CPC ....... B60R 22/28; B60R 22/46; B60R 22/405; B60R 22/4628; B60R 2022/468; B60R 2022/4647
See application file for complete search history.

(56) References Cited

U.S. PATENT DOCUMENTS 6,612,514 B1   9/2003  Schmidt
7,988,084 B2 * 8/2011  Lombarte ........... B60R 22/4628
                                                   242/374
(Continued)

FOREIGN PATENT DOCUMENTS

DE    102012217261 A1    3/2014
JP       2010018179 A    1/2010
(Continued)

OTHER PUBLICATIONS

International Search Report and Written Opinion issued in the corresponding application PCT/JP2017/002556 dated Mar. 14, 2017.

*Primary Examiner* — Sang K Kim
(74) *Attorney, Agent, or Firm* — Roberts Calderon Safran & Cole P.C.

(57) ABSTRACT

In a vehicle emergency, rotation of a lock base in a pull-out direction opposite to a take-up direction is restricted. A first pinion-configuring portion formed at an outer circumferential portion of the lock base configures one width direction side of a pinion section that is rotated in the take-up direction by a rack that moves due to fluid pressure in a vehicle emergency. A coupling member disposed between the lock base and the torsion shaft is fixed to the lock base and to a torsion shaft. A second pinion-configuring portion that configures a width direction other side of the pinion section is formed alongside the first pinion-configuring portion at an outer circumferential portion of the coupling member.

5 Claims, 6 Drawing Sheets

(52) U.S. Cl.
CPC ........ *B60R 22/46* (2013.01); *B60R 2022/468* (2013.01); *B60R 2022/4647* (2013.01)

(56) References Cited

U.S. PATENT DOCUMENTS

| | | |
|---|---|---|
| 2010/0013205 A1 | 1/2010 | Keller et al. |
| 2011/0147509 A1* | 6/2011 | Wang .................. B60R 22/3413 242/374 |
| 2011/0215184 A1* | 9/2011 | Clute .................. B60R 22/3413 242/374 |
| 2012/0049500 A1* | 3/2012 | Wang .................. B60R 22/4628 280/806 |

FOREIGN PATENT DOCUMENTS

| | | |
|---|---|---|
| JP | 2010023754 A | 2/2010 |
| JP | 2012-509808 A | 4/2012 |
| WO | WO98/36953 A1 | 8/1998 |

* cited by examiner

WEBBING TAKE-UP DEVICE

CROSS-REFERENCE TO RELATED APPLICATIONS

The present application is a U.S. National Phase of PCT/JP2017/002556 filed on Jan. 25, 2017, claiming priority to Japanese Patent Application No. 2016-028313 filed Feb. 17, 2016. The disclosure of the PCT Application is hereby incorporated by reference into the present Application.

TECHNICAL FIELD

The present invention relates to a webbing take-up device.

BACKGROUND ART

Webbing take-up devices are known in which a pinion for rotating a spool in a take-up direction in a vehicle emergency is disposed at the outer circumferential side of a shaft portion of a lock base fixed to a torsion shaft (for example, see Japanese National-Phase Publication No. 2012-509808). In such webbing take-up devices, in order to suppress the axial direction length of the device, a portion where the torsion shaft is fitted into the shaft portion of the lock base may overlap with the pinion at an axial direction position of the device.

SUMMARY OF INVENTION

Technical Problem

However, with such a configuration, the diameter of the pinion is increased and a rack and the like for rotating the pinion are made longer in order to ensure that a given amount of webbing is taken up.

In consideration of the above circumstances, an object of the present invention is to obtain a webbing take-up device capable of suppressing the diameter of a pinion section.

Solution to Problem

A webbing take-up device of a first aspect of the present disclosure includes a spool, a torsion shaft, a first member, a second member, and a lock portion. The spool takes up webbing of a seatbelt device by being rotated in a take-up direction. The torsion shaft is housed within the spool and is disposed running along an axial direction of the spool. The torsion shaft is retained by the spool at an other-end-side of an axial direction one end of the spool. The first member is provided to the axial direction one-end-side of the spool. An outer circumferential portion of the first member is formed with a first pinion-configuring portion. The first pinion-configuring portion configures one width direction side of a pinion section that is rotated in the take-up direction by a moving member that moves due to fluid pressure in a vehicle emergency. The second member is disposed between the first member and the torsion shaft and is fixed to the first member and to the torsion shaft. An outer circumferential portion of the second member is formed with a second pinion-configuring portion configuring a width direction other side of the pinion section alongside the first pinion-configuring portion. The lock portion restricts rotation of one out of the first member or the second member in a pull-out direction opposite to the take-up direction in a vehicle emergency.

In the webbing take-up device of the first aspect of the present disclosure, in a vehicle emergency, rotation of the one out of the first member or the second member in the pull-out direction opposite to the take-up direction is restricted by the lock portion. The first pinion-configuring portion formed at the outer circumferential portion of the first member configures the one width direction side of the pinion section that is rotated in the take-up direction by the moving member that moves due to fluid pressure in a vehicle emergency. The second member disposed between the first member and the torsion shaft is fixed to the first member and to the torsion shaft, and an outer circumferential portion of the second member is formed with the second pinion-configuring portion that configures the width direction other side of the pinion section alongside the first pinion-configuring portion. The diameter of the pinion section can thereby be suppressed compared to cases in which a pinion is provided as a separate body disposed at the outer circumferential side of a member that in a vehicle emergency is restricted from rotating in the pull-out direction by the lock portion.

A webbing take-up device of a second aspect of the present disclosure is the configuration of the first aspect, wherein a cylindrical fitted-to portion into which the torsion shaft is fitted is formed in the second member, with the fitted-to portion being provided so as to be coaxial with the pinion section. A tooth bottom of the pinion section is set at a position to the radial direction inside of an outer circumferential face of the fitted-to portion.

In the webbing take-up device of the second aspect of the present disclosure, a tooth bottom of the pinion section is set at a position to the radial direction inside of the outer circumferential face of the fitted-to portion, enabling the diameter of the pinion section to be suppressed even further.

A webbing take-up device of a third aspect of the present disclosure is the configuration of the first aspect or the second aspect, wherein a hole is formed passing through an axial center of the second member, a ring shaped seating portion oriented toward the torsion shaft is formed inside the hole, and the first member includes a projecting portion that is housed in the hole and that is swaged and fixed to the seating portion.

In the webbing take-up device of the third aspect of the present disclosure, the projecting portion of the first member is housed in the hole of the second member and is swaged and fixed to the seating portion formed in the hole, thereby securely fixing the first member to the second member in a state retained from coming out along a thrust direction.

A webbing take-up device of a fourth aspect of the present disclosure is the configuration of any one of the first aspect to the third aspect, wherein a hole is formed passing through an axial center of the second member, and the first member includes a projecting portion that is housed in the hole in a state retained from coming out. A fitting recess is provided at an outer circumferential side of the projecting portion of the first member, with the fitting recess being recessed away from the spool and formed in a ring shape around the projecting portion, and plural female splines being formed in an inner circumferential face at the radial direction outside of the fitting recess. The second member is provided with a fitting protrusion, with the fitting protrusion projecting out away from the spool and being formed in a ring shape around the projecting portion, and plural male splines that mesh with the plural female splines being formed to an outer circumferential face of the fitting protrusion.

In the webbing take-up device of the fourth aspect of the present disclosure, the male splines of the fitting protrusion of the second member mesh with the female splines of the fitting recess of the first member at the outer circumferential side of the projecting portion of the first member, locking rotation thereof at the outer circumferential side of the projecting portion. This enables the efficient transmission of torque load between the first member and the second member.

A webbing take-up device of a fifth aspect of the present disclosure is the configuration of the fourth aspect, wherein a cylindrical fitted-to portion into which the torsion shaft is fitted is formed in the second member, with the fitted-to portion being provided so as to be coaxial with the fitting protrusion. An outer circumferential face of the fitting protrusion of the second member is set at a position to the radial direction outside of an outer circumferential face of a location of the torsion shaft fitted into the fitted-to portion.

In the webbing take-up device of the fifth aspect of the present disclosure, the outer circumferential face of the fitting protrusion of the second member is set at a position to the radial direction outside of the outer circumferential face of a location of the torsion shaft fitted into the fitted-to portion, enabling even more efficient transmission of torque load from the torsion shaft side.

Advantageous Effects of Invention

As described above, the webbing take-up device according to the present invention has the excellent advantageous effects of enabling the diameter of a pinion section to be suppressed.

DESCRIPTION OF EMBODIMENTS

Configuration of Exemplary Embodiment

Explanation follows regarding a webbing take-up device according to an exemplary embodiment of the present invention, with reference to FIG. 1 to FIG. 5. Note that in the drawings, the arrow A indicates an axial direction one-end-side of a spool 14 in a webbing take-up device 10, and the arrow B indicates the axial direction other-end-side of the spool 14 in the webbing take-up device 10.

Figure 1:
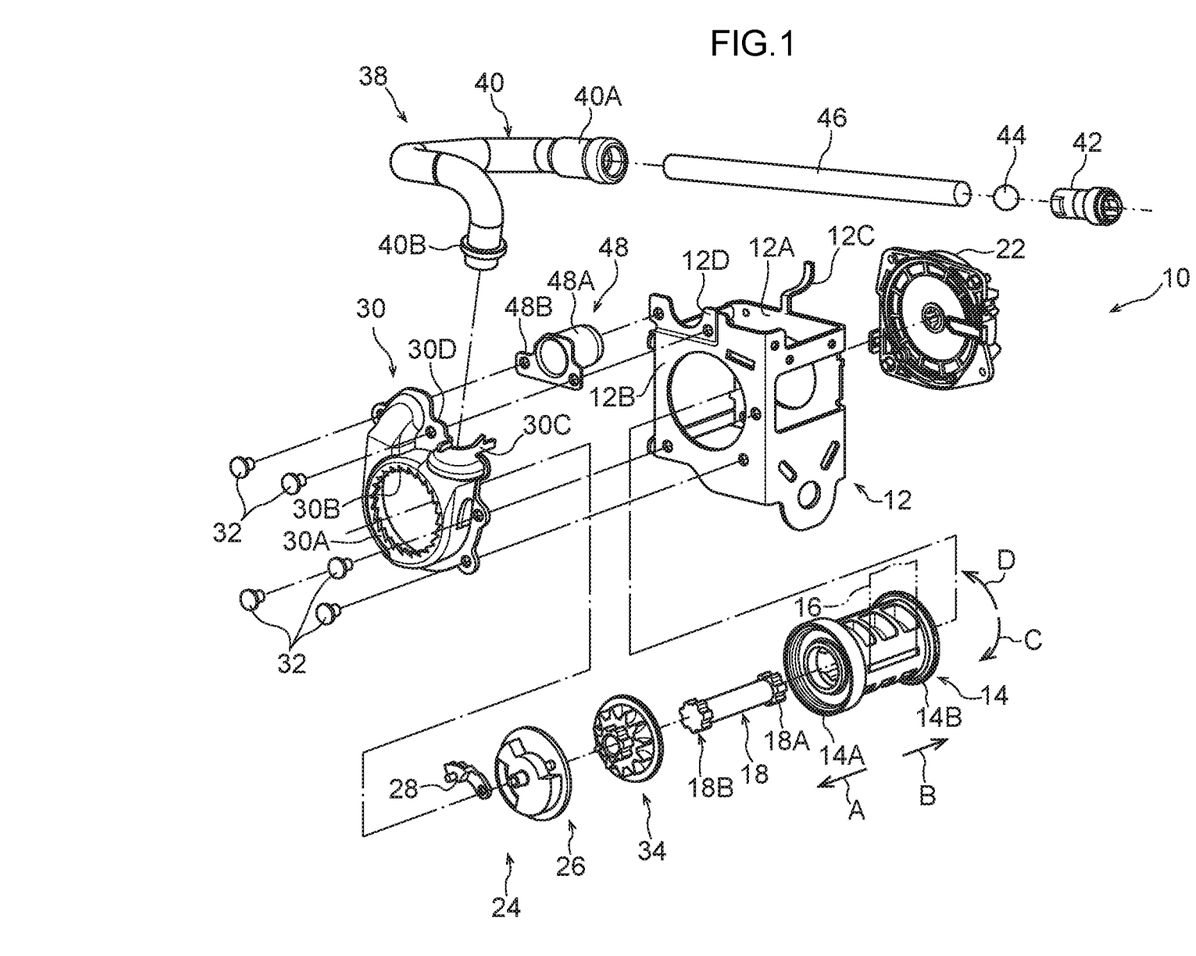
FIG. 1 is an exploded perspective view illustrating part of a webbing take-up device according to an exemplary embodiment of the present invention.

FIG. 1 is an exploded perspective view illustrating part of the webbing take-up device 10 according to the present exemplary embodiment. As illustrated in this figure, the webbing take-up device 10 includes a frame 12. The frame 12 is fixed to a vehicle lower side portion of a center pillar (not illustrated in the drawings) configuring a vehicle body framework member in a vehicle. The frame 12 includes leg plates 12A, 12B. The leg plates 12A, 12B face each other.

A substantially circular tube shaped spool 14 is provided to the frame 12. The direction of the central axis of the spool 14 runs in the direction in which the leg plate 12A and the leg plate 12B face each other, and the spool 14 is configured so as to be capable of rotating about its central axis. A length direction base end of an elongated strap-shaped webbing 16 of a seatbelt device is anchored to the spool 14. Rotating the spool 14 in a take-up direction (arrow C direction) takes up the webbing 16 onto the spool 14 starting from a length direction base end side thereof. A length direction leading end side of the webbing 16 extends from the spool 14 to the vehicle upper side. The length direction leading end side of the webbing 16 is then folded back toward the vehicle lower side as it passes through a slit formed in a through anchor (not illustrated in the drawings) at the vehicle upper side of the frame 12. Note that the through anchor is supported by the center pillar.

A length direction leading end of the webbing 16 is anchored to an anchor plate (not illustrated in the drawings). The anchor plate is formed from a sheet of metal such as steel, and is fixed to the vehicle floor (not illustrated in the drawings), to a framework member of a seat (not illustrated in the drawings) corresponding to the present webbing take-up device 10, or the like.

The vehicle seatbelt device to which the present webbing take-up device 10 is applied includes a buckle device (not illustrated in the drawings). The buckle device is provided at the vehicle width direction inner side of the seat to which the present webbing take-up device 10 is applied. The webbing 16 is worn over the body of an occupant seated in the seat by engaging a tongue (not illustrated in the drawings) provided to the webbing 16 with the buckle device in a state in which the webbing 16 has been entrained around the body of the occupant.

A spring housing 22 is provided at an outer face side of the leg plate 12A of the frame 12 (outside the frame 12). A spool biasing portion such as a spiral spring (not illustrated in the drawings) is provided inside the spring housing 22. The spool 14 is biased in the take-up direction of the webbing 16 (arrow C direction) by biasing force from the spool biasing portion.

A lock mechanism 24 is provided at an outer face side of the leg plate 12B of the frame 12 (outside the frame 12). The lock mechanism 24 includes a lock base 26, which serves as a first member. The lock base 26 is provided at an axial direction one-end-side of the spool 14 (see the arrow A direction), and is configured so as to be coaxial with the spool 14 and capable of rotating relative to the spool 14 such that when rotational force from the spool 14 is transmitted to the lock base 26, the lock base 26 is capable of rotating about the central axis of the spool 14. The lock base 26 is die-cast in the present exemplar) embodiment. The lock mechanism 24 further includes a sensor mechanism (not illustrated in the drawings). Note that the sensor mechanism is, for example, that known from Japanese Patent Application Laid-Open (JP-A) No. 2014-162290, and so detailed explanation thereof will not be given. The sensor mechanism is actuated in a vehicle emergency such as a vehicle collision. When the sensor mechanism is actuated, a lock pawl 28, serving as a lock portion, provided to the lock base 26 is moved toward a rotational radius direction outside of the lock base 26.

A cover plate 30 is fixed to the leg plate 12B of the frame 12 using rivets 32. The cover plate 30 is recessed away from the frame 12 and includes a plate portion 30A. The plate portion 30A of the cover plate 30 is disposed at the outer face side of the leg plate 12B of the frame 12 (outside the frame 12) so as to face the leg plate 12B.

A ratchet hole 30B, serving as a lock portion, is formed passing through the plate portion 30A of the cover plate 30. The lock base 26 of the lock mechanism 24 passes through the ratchet hole 30B of the cover plate 30. When the sensor mechanism of the lock mechanism 24 is actuated and the lock pawl 28 of the lock base 26 is moved toward the rotational radius direction outside of the lock base 26, the lock pawl 28 meshes with ratchet teeth in the ratchet hole 30B of the cover plate 30. The lock base 26 is thereby restricted from rotating in a pull-out direction (arrow D direction) running opposite to the take-up direction in a vehicle emergency.

The webbing take-up device 10 includes a torsion shaft 18 that configures a force limiter. The torsion shaft 18 is formed in a rod shape, and is housed in an axial center portion of the spool 14 so as to be disposed running along the axial direction of the spool 14. A first axial direction end 18A of the torsion shaft 18 is retained in the spool 14 at an axial direction other end 14B side of the spool 14 (at the other-end-side of an axial direction one end 14A) in a state in which rotation relative to the spool 14 is prevented. A second axial direction end 18B of the torsion shaft 18 is linked to the lock base 26 via a coupling member 34 serving as a second member.

The coupling member 34 is disposed between the lock base 26 and the torsion shaft 18 and is fixed to the lock base 26 and to the torsion shaft 18. Rotation of the torsion shaft 18 relative to the lock base 26 is thereby prevented. The lock base 26 is linked to the spool 14 in a state in which the coupling member 34 and the torsion shaft 18 prevent rotation of the lock base 26 relative to the spool 14. In the present exemplary embodiment, the coupling member 34 is die-cast. Note that detailed description of the lock base 26 and the coupling member 34 will be given later.

The webbing take-up device 10 includes a pretensioner 38. The pretensioner 38 includes a pipe 40 (tubular member). The pipe 40 is formed in a substantially circular tube shape overall, and includes plural bends. An axial direction base end of the pipe 40 is configured with a micro gas generator mounting portion 40A. The micro gas generator mounting portion 40A is supported by a support 12C that is provided at an upper end side of the leg plate 12A of the frame 12. A micro gas generator 42 (a gas generation unit, this being one embodiment of a fluid supply portion) is mounted to the micro gas generator mounting portion 40A.

The micro gas generator 42 is electrically connected, via an ECU serving as a controller, to a collision detection sensor provided to the vehicle (neither of which are illustrated in the drawings). When the collision detection sensor has detected an impact in a vehicle collision, the ECU activates the micro gas generator 42 such that gas, this being one embodiment of a fluid, generated by the micro gas generator 42 is supplied to the inside of the pipe 40.

An axial direction leading end of the pipe 40 is configured with a cover plate attachment portion 40B with an downward-pointing opening. The cover plate attachment portion 40B is attached to a pipe attachment portion 30C provided at an upper portion of the cover plate 30, and is disposed at the vehicle width direction inner side of (in front of, in the figure) the central axis of the spool 14.

The pretensioner 38 includes a rack 46, which serves as a moving member. The rack 46 is made of synthetic resin, and is formed into a rod shape from a material that is softer than the lock base 26 and the coupling member 34. The rack 46 is disposed inside the pipe 40. Note that a seal ball 44 is disposed between the rack 46 and the micro gas generator 42 inside the pipe 40. The rack 46 is configured to move through the inside of the pipe 40 and the inside of the cover plate 30 (namely, at an axial direction one-end-side of the spool 14) due to pressure from fluid supplied from the micro gas generator 42 in a vehicle emergency.

A stopper-attached portion 30D is provided to the upper portion of the cover plate 30 at the vehicle width direction outer side of (in the figure, the far side of) the pipe attachment portion 30C. A stopper-attached portion 12D is also provided to an upper portion of the leg plate 12B of the frame 12, at a portion facing the stopper-attached portion 30D of the cover plate 30. A flange 48B of a rack stopper 48 is disposed between the stopper-attached portion 30D of the cover plate 30 and the stopper-attached portion 12D of the frame 12, with the flange 48B fastened thereto by the rivets 32. A main body 48A of the rack stopper 48 is configured with a bottomed, cylindrical shape with an opening facing the cover plate 30 side. The main body 48A of the rack stopper 48 restricts movement of the rack 46 after the rack 46 has moved through the inside of the cover plate 30.

Figure 2:
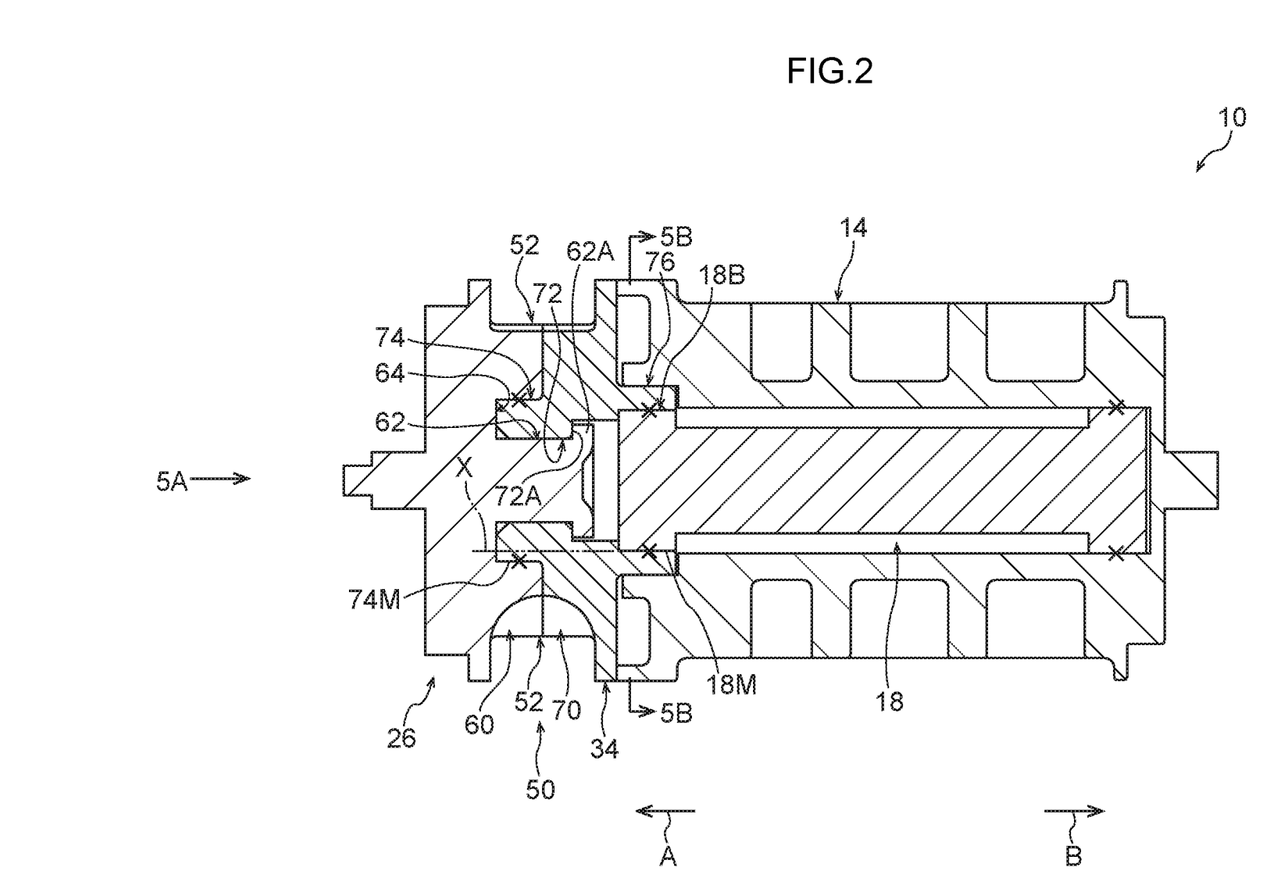
FIG. 2 is a cross-section illustrating part of the webbing take-up device in FIG. 1 in a state sectioned along line 2-2 in FIG. 5A.
Figure 3:
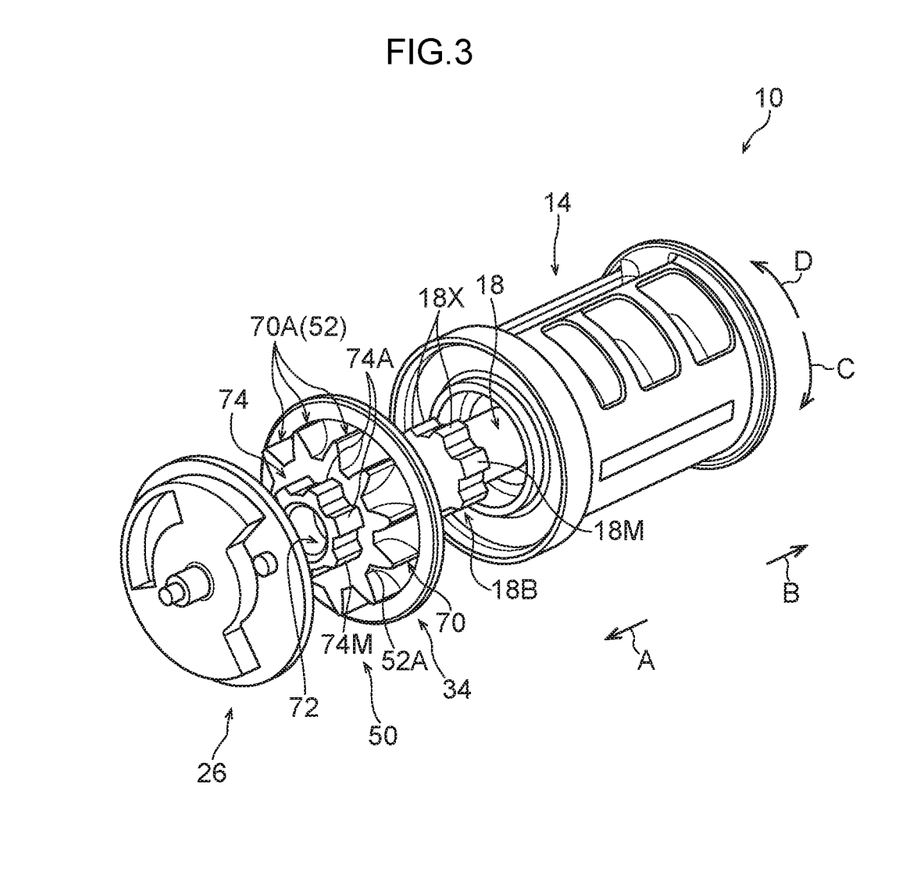
FIG. 3 is an enlarged exploded perspective view illustrating part of the webbing take-up device in FIG. 1.
Figure 4:
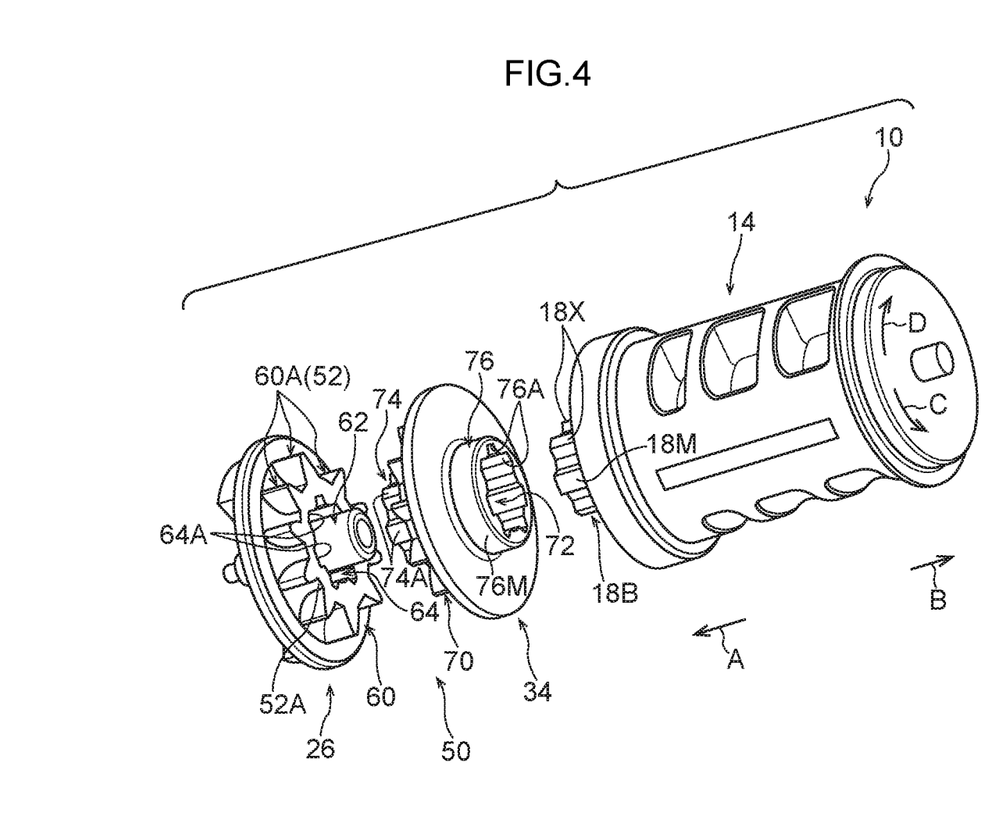
FIG. 4 is an enlarged exploded perspective view illustrating part of the webbing take-up device in FIG. 1 in a state viewed along a different direction than in FIG. 3.

Detailed explanation follows regarding the lock base 26 and the coupling member 34. FIG. 2 is a cross-section illustrating part of the webbing take-up device 10 in a state sectioned along the line 2-2 in FIG. 5A (a view from the outer face side of the lock base 26). FIG. 3 and FIG. 4 are exploded perspective views each illustrating part of the webbing take-up device 10 in an enlarged state.

As illustrated in these figures, a first pinion-configuring portion 60 that configures one width direction side of a pinion section 50 is formed at an outer circumferential portion of the lock base 26. A second pinion-configuring portion 70 that is provided alongside the first pinion-configuring portion 60 and configures a width direction other side of the pinion section 50 is formed at an outer circumferential portion of the coupling member 34. The pinion section 50 configured by the first pinion-configuring portion 60 and the second pinion-configuring portion 70 includes plural engagement teeth 52 that configure part of the pretensioner 38 (see FIG. 1). Note that in FIG. 3, locations on the engagement teeth 52 configured by the second pinion-configuring portion 70 are labeled 70A, and in FIG. 4, locations on the engagement teeth 52 configured by the first pinion-configuring portion 60 are labeled 60A.

As illustrated in FIG. 3 and FIG. 4, the engagement teeth 52 are formed at uniform angular intervals around the rotational center of the pinion section 50 in a radiating pattern. A dimension of the engagement teeth 52 along the rotational circumference direction of the pinion section 50 is set so as to become smaller on progression toward the radial direction outside of the pinion section 50. The engagement teeth 52 of the pinion section 50 are set to receive load from the rack 46 moving through the inside of the pipe 40 illustrated in FIG. 1 due to fluid pressure in a vehicle emergency, such that the pinion section 50 (see FIG. 4) is rotated in the take-up direction (arrow C direction) by the moving rack 46.

As illustrated in FIG. 2 to FIG. 4, a hole 72 is formed passing through the axial center of the coupling member 34. A ring shaped seating portion 72A (see FIG. 2) oriented toward the torsion shaft 18 is formed inside the hole 72. The lock base 26 includes a boss-shaped projecting portion 62 that projects out toward the torsion shaft 18 and is housed within the hole 72 of the coupling member 34 in a state retained from coming out. As illustrated in FIG. 2, the projecting portion 62 of the lock base 26 includes a swaged portion 62A that is swaged and fixed to the seating portion 72A of the coupling member 34.

A fitting recess 64 is provided at the outer circumferential side of the projecting portion 62 of the lock base 26. The fitting recess 64 is recessed away from the spool 14 and is formed in a ring shape around the projecting portion 62. Plural female splines 64A (see FIG. 4) are formed in an inner circumferential face at the radial direction outside of the fitting recess 64. A fitting protrusion 74 is provided to the coupling member 34. The fitting protrusion 74 projects out away from the spool 14 and is formed in a ring shape around the projecting portion 62. As illustrated in FIG. 3 and FIG. 4, plural male splines 74A that mesh with the plural female splines 64A of the fitting recess 64 of the lock base 26 are formed to an outer circumferential face of the fitting protrusion 74 of the coupling member 34. The fitting protrusion 74 of the coupling member 34 is thereby fitted together with the fitting recess 64 in the lock base 26.

Figure 5A:
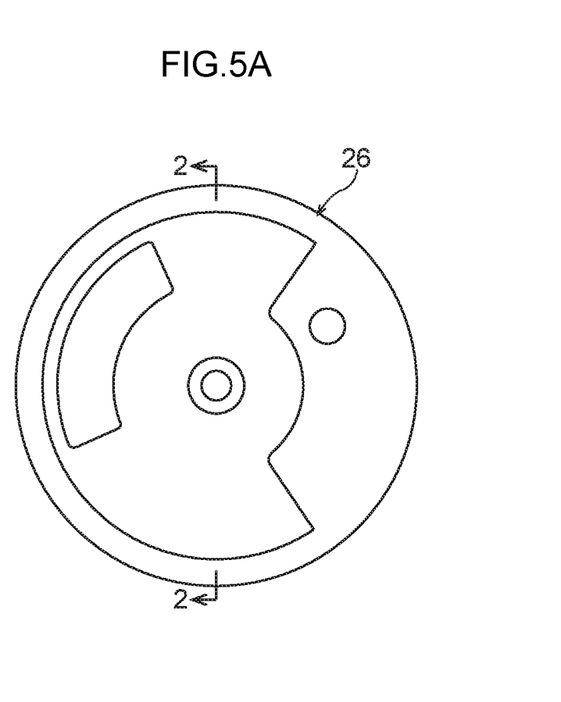
FIG. 5A is a side view illustrating a state viewed along the arrow 5A direction in FIG. 2.
Figure 5B:
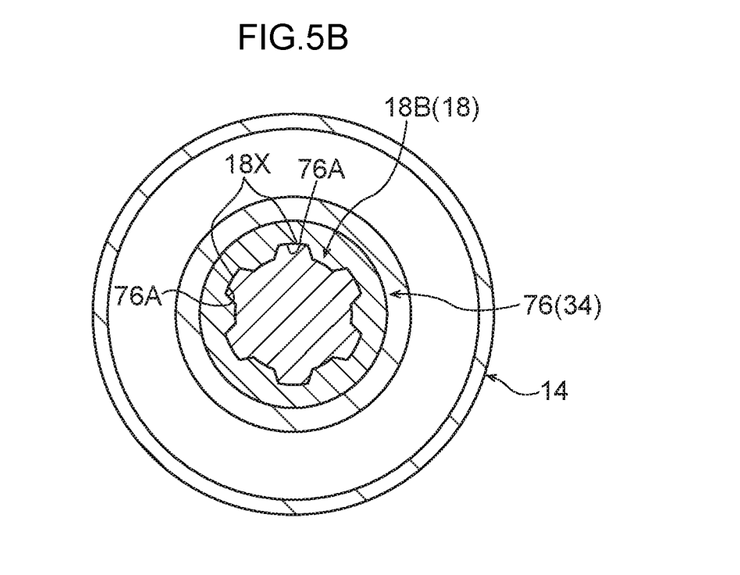
FIG. 5B is a cross-section illustrating a state sectioned along line 5B-5B in FIG. 2.

As illustrated in FIG. 2 and FIG. 4, the coupling member 34 is also formed with cylindrical fitted-to portion 76 into which the second end 18B of the torsion shaft 18 is fitted. The fitted-to portion 76 is provided so as to be coaxial with the pinion section 50, and so as to be coaxial with the fitting protrusion 74. Plural female splines 76A are formed in an inner circumferential face of the fitted-to portion 76. Plural male splines 18X that mesh with the plural female splines 76A of the fitted-to portion 76 of the coupling member 34 are formed in an outer circumferential face 18M of the second end 18B of the torsion shaft 18. The second end 18B of the torsion shaft 18 is thereby fitted together with the fitted-to portion 76 of the coupling member 34 as illustrated in FIG. 5B. Further, as illustrated in FIG. 2, an outer circumferential face 74M of the fitting protrusion 74 of the coupling member 34 is set at a position to the radial direction outside of the outer circumferential face 18M of the second end 18B of the torsion shaft 18 (see double-dotted dashed line X).

Operation and Advantageous Effects of Exemplary Embodiment

Explanation follows regarding the operation and advantageous effects of the above exemplary embodiment.

In the webbing take-up device 10 illustrated in FIG. 1, in a vehicle collision, this being one kind of vehicle emergency, when the lock pawl 28 meshes with the ratchet teeth of the ratchet hole 30B, rotation of the lock base 26 in the pull-out direction (arrow D direction) is restricted. Further, when the micro gas generator 42 of the pretensioner 38 is actuated by the ECU in a vehicle collision, high-pressure gas is rapidly supplied into the pipe 40 from the micro gas generator 42. This gas pressure moves the rack 46 inside the pipe 40 such that the rack 46 is pushed out from the axial direction leading end side of the pipe 40. Then, when the pushed-out rack 46 presses on the engagement teeth 52 of the pinion section 50 illustrated in FIG. 2, the pinion section 50 rotates in the take-up direction (the arrow C direction in FIG. 1, etc.).

The lock base 26 and the coupling member 34 configuring the pinion section 50 are linked to the spool 14 through the torsion shaft 18 of the force limiter mechanism such that rotation relative to the spool 14 is prevented. Thus, rotating the pinion section 50 in the take-up direction, rotates the spool 14 illustrated in FIG. 1, etc., in the take-up direction (arrow C direction). The webbing 16 is thereby taken up onto the spool 14, increasing the force with which the webbing 16 restrains the occupant.

In the present exemplary embodiment, as illustrated in FIG. 2, the first pinion-configuring portion 60 formed at the outer circumferential portion of the lock base 26 configures a location at one width direction side of the pinion section 50. The second pinion-configuring portion 70 formed at the outer circumferential portion of the coupling member 34 configures a location at the width direction other side of the pinion section 50. The diameter of the pinion section is thereby able to be suppressed compared to, for example, cases in which a pinion is provided as a separate body disposed at the outer circumferential side of the lock base.

Further, in the present exemplary embodiment, the projecting portion 62 of the lock base 26 is housed in the hole 72 of the coupling member 34 and is swaged and fixed to the seating portion 72A formed in the hole 72. The lock base 26 is thereby securely fixed to the coupling member 34 in a state retained from coming out along a thrust direction. Load acting on the pinion section 50 (see FIG. 2) when the pretensioner 38 illustrated in FIG. 1 is actuated is thus able to be even increased even further, thereby enhancing the performance of the pretensioner 38.

Further, in the present exemplary embodiment, the male splines 74A of the fitting protrusion 74 of the coupling member 34 (see FIG. 3) mesh with the female splines 64A of the fitting recess 64 of the lock base 26 (see FIG. 4) at the outer circumferential side of the projecting portion 62 of the lock base 26 illustrated in FIG. 2, locking rotation thereof at the outer circumferential side of the projecting portion 62. Thus, even when a larger force limiter load or load caused by actuation of the pretensioner 38 (see FIG. 1) has been applied, torque load between the coupling member 34 and the lock base 26 is able to be efficiently transmitted, enabling performance to be enhanced in this regard too.

Further, in the present exemplary embodiment, the outer circumferential face 74M of the fitting protrusion 74 of the coupling member 34 is set to the radial direction outside of the outer circumferential face 18M of the second end 18B of the torsion shaft 18 fitted into the fitted-to portion 76 (see the double-dotted dashed line X). This enables torque load from the torsion shaft 18 side to be even more efficiently transmitted.

As described above, the webbing take-up device 10 according to the present exemplary embodiment enables the diameter of the pinion section 50 to be suppressed. As a result, even when the length of the pipe 40 and the rack 46 illustrated in FIG. 1 is suppressed, it is possible to ensure that a given amount of the webbing 16 is taken up (pulled in) when the pretensioner 38 is actuated. This enables size to be reduced and enables costs to be kept down.

Note that providing a fitting structure of the fitting recess 64 and the fitting protrusion 74 at the outer circumferential side of the projecting portion 62 of the lock base 26 illustrated in FIG. 2 enables the formation of a large diameter circular column portion (thick portion) to the lock base 26 and the coupling member 34 to be avoided. At the same time, respective locations of the lock base 26 and the coupling member 34 can be made to have nearly equal thicknesses, and the surface areas of the lock base 26 and the coupling member 34 are able to be increased, which in turn enables component cooling time to be reduced during die cast molding. This enables improved manufacturability and keeps costs down.

Modified Examples

Figure 6A:
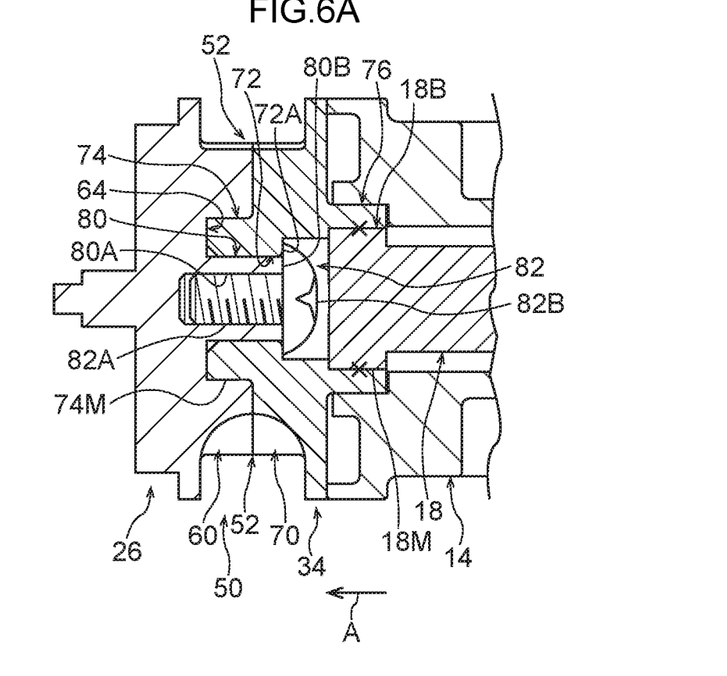
FIG. 6A is a cross-section illustrating part of a webbing take-up device according to a first modified example.
Figure 6B:
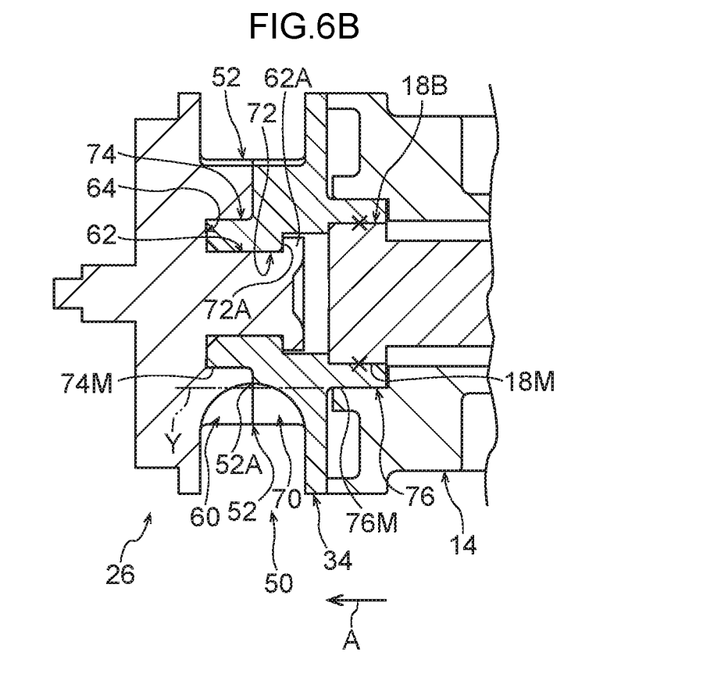
FIG. 6B is a cross-section illustrating part of a webbing take-up device according to a second modified example.

Explanation follows regarding modified examples of the exemplary embodiment, with reference to FIG. 6A and FIG.

6B. FIG. 6A is a cross-section illustrating part of a webbing take-up device according to a first modified example. FIG. 6B is a cross-section illustrating part of a webbing take-up device according to a second modified example. Note that these modified examples are configured essentially the same as the exemplary embodiment except for in the following respects.

In the first modified example illustrated in FIG. 6A, the lock base 26 includes a projecting portion 80 that is housed in the hole 72 of the coupling member 34 in a state retained from coming out. Note that the same reference signs are given to configuration in the first modified example that is essentially the same as that in the exemplary embodiment, and explanation thereof will not be given. A bolt fastening hole 80A is formed in the lock base 26 at a location encompassing the axial center of the projecting portion 80, and a female threaded portion is formed in an inner circumferential face of the bolt fastening hole 80A. A shaft 82A of a bolt 82 is screwed into the bolt fastening hole 80A from the torsion shaft 18 side. A head 82B of the bolt 82 is seated on a projection apex face 80B of the projecting portion 80 and on the seating portion 72A of the hole 72. The lock base 26 and the coupling member 34 are thereby fastened together. This first modified example is able to obtain substantially the same operation and advantageous effects as in the exemplary embodiment.

The second modified example illustrated in FIG. 6B is configured substantially similarly to the exemplary embodiment except for in that the diameter of the pinion section 50 is set smaller than in the exemplary embodiment, and so for convenience the same reference signs as in the exemplary embodiment are employed therefor. In this modified example, teeth bottom 52A in the pinion section 50 are set at a position to the radial direction inside of an outer circumferential face 76M of the fitted-to portion 76 (see double-dotted dashed line Y). In the second modified example, since the diameter of the pinion section 50 is set smaller, even if the length of the pipe 40 and the rack 46 illustrated in FIG. 1 are shortened, it is possible to ensure that a given amount of the webbing 16 is taken up (pulled in) when the pretensioner 38 is actuated.

Note that in the exemplary embodiment, a first member including a first pinion-configuring portion configures the lock base 26. However, in a modified example of the exemplary embodiment, a second member including a second pinion-configuring portion may configure a lock base, and configuration may be adopted in which in a vehicle emergency, rotation of the lock base in a pull-out direction opposite to a take-up direction is restricted by a lock portion. The lock portion in this case may, for example, include outer teeth formed at locations on the spool side of an outer circumferential portion of a lock base serving as the second member, and a lock pawl that meshes with the outer teeth when a sensor mechanism has been actuated in a vehicle emergency. Note that the configuration in which a lock pawl meshes with outer teeth of the lock base in a vehicle emergency may be that known from JP-A 2011-255814, for example, and so detailed explanation thereof will not be given.

Further, the joining structure between the first member and the second member may be a different structure than in the exemplary embodiment and the modified examples.

Note that other embodiments that combine elements of the exemplary embodiment and the plural modified examples as appropriate may also be implemented.

Explanation has been given regarding examples of the present invention. However, the present invention is not limited to the above, and obviously various other modifications may be implemented within a range not departing from the spirit of the present invention.

The disclosure of Japanese Patent Application No. 2016-028313, filed on Feb. 17, 2016, is incorporated in its entirety by reference herein.

The invention claimed is:

1. A webbing take-up device comprising:
   a spool that takes up webbing of a seatbelt device by being rotated in a take-up direction;
   a torsion shaft that is housed within the spool and is disposed running along an axial direction of the spool, the torsion shaft being retained by the spool at an other-end-side of an axial direction one end of the spool;
   a first member that is provided at the axial direction one-end-side of the spool, an outer circumferential portion of the first member being formed with a first pinion-configuring portion, the first pinion-configuring portion configuring one width direction side of a pinion section that is rotated in the take-up direction by a moving member that moves due to fluid pressure in a vehicle emergency;
   a second member that is disposed between the first member and the torsion shaft, and that is fixed at the first member and at the torsion shaft, an outer circumferential portion of the second member being formed with a second pinion-configuring portion configuring a width direction other side of the pinion section alongside the first pinion-configuring portion; and
   a lock portion that restricts rotation of one out of the first member or the second member in a pull-out direction opposite to the take-up direction in a vehicle emergency.

2. The webbing take-up device of claim 1, wherein: a cylindrical fitted-to portion, into which the torsion shaft is fitted, is formed in the second member, the fitted-to portion being provided so as to be coaxial with the pinion section; and a tooth bottom of the pinion section is set at a position to the radial direction inside of an outer circumferential face of the fitted-to portion.

3. The webbing take-up device of claim 1, wherein: a hole is formed passing through an axial center of the second member, a ring shaped seating portion oriented toward the torsion shaft being formed inside the hole; and the first member includes a projecting portion that is housed in the hole and that is swaged and fixed to the seating portion.

4. The webbing take-up device of claim 1, wherein:
   a hole is formed passing through an axial center of the second member, and the first member includes a projecting portion that is housed in the hole in a state retained from coming out;
   a fitting recess is provided at an outer circumferential side of the projecting portion of the first member, the fitting recess being recessed away from the spool and formed in a ring shape around the projecting portion, and a plurality of female splines being formed in an inner circumferential face at the radial direction outside of the fitting recess; and
   when the second member meshes with the first member, the second member is provided with a fitting protrusion, the fitting protrusion projecting out away from the spool and being formed in a ring shape around the projecting portion of the first member, and a plurality of male splines that mesh with the plurality of female splines being formed to an outer circumferential face of the fitting protrusion.

5. The webbing take-up device of claim 4, wherein:
a cylindrical fitted-to portion into which the torsion shaft is fitted is formed in the second member, the fitted-to portion being provided so as to be coaxial with the fitting protrusion; and
the outer circumferential face of the fitting protrusion of the second member is set at a position to the radial direction outside of an outer circumferential face of a location of the torsion shaft fitted into the fitted-to portion.

* * * * *